United States Patent [19]
Arai et al.

[11] Patent Number: 5,209,610
[45] Date of Patent: May 11, 1993

[54] THROWAWAY MILLING CUTTER

[75] Inventors: Tatsuo Arai; Takayoshi Saito, both of Ibaraki, Japan

[73] Assignee: Mitsubishi Materials Corporation, Tokyo, Japan

[21] Appl. No.: 834,195

[22] Filed: Feb. 12, 1992

[30] Foreign Application Priority Data

| Feb. 14, 1991 | [JP] | Japan | 3-21081 |
| Feb. 22, 1991 | [JP] | Japan | 3-8392[U] |
| Mar. 22, 1991 | [JP] | Japan | 3-17606[U] |
| Mar. 22, 1991 | [JP] | Japan | 3-17607[U] |
| Mar. 22, 1991 | [JP] | Japan | 3-17608[U] |

[51] Int. Cl.$^5$ ............................................. B23C 5/24
[52] U.S. Cl. ................................. 407/36; 407/44; 407/49
[58] Field of Search ............... 407/34, 36–41, 407/44, 45, 49, 51, 52

[56] References Cited

U.S. PATENT DOCUMENTS

| 3,058,198 | 10/1962 | Williams | 407/49 X |
| 4,575,287 | 3/1986 | Oshnock et al. | 407/41 |
| 4,708,536 | 11/1987 | Sullivan | 407/41 |
| 4,993,891 | 2/1991 | Kaminiski et al. | 407/51 X |

FOREIGN PATENT DOCUMENTS

| 0167504 | 1/1986 | European Pat. Off. |
| 2757273 | 7/1979 | Fed. Rep. of Germany |
| 60-186311 | 5/1986 | Japan |

Primary Examiner—Steven C. Bishop
Attorney, Agent, or Firm—Cushman, Darby & Cushman

[57] ABSTRACT

A throughaway milling cutter is disclosed: a cutter body rotatable about an axis; at least one recess formed at a front face of the cutter body and having a bottom wall and side walls; an inclined face formed at the bottom wall and inclined about the front face; a cartridge inserted in the recess movably along the inclination direction of the inclined face; a wiper cutting insert removably mounted to the cartridge and having a wiper cutting edge generally parallel to a plan perpendicular to the axis of the cutter body and a front flank face disposed adjacent to the wiper cutting edge; a wedge inserted between the side wall and the cartridge and capable of moving the cartridge along the inclination direction of the inclined face; and a means for clamping the cartridge to the recess.

11 Claims, 11 Drawing Sheets

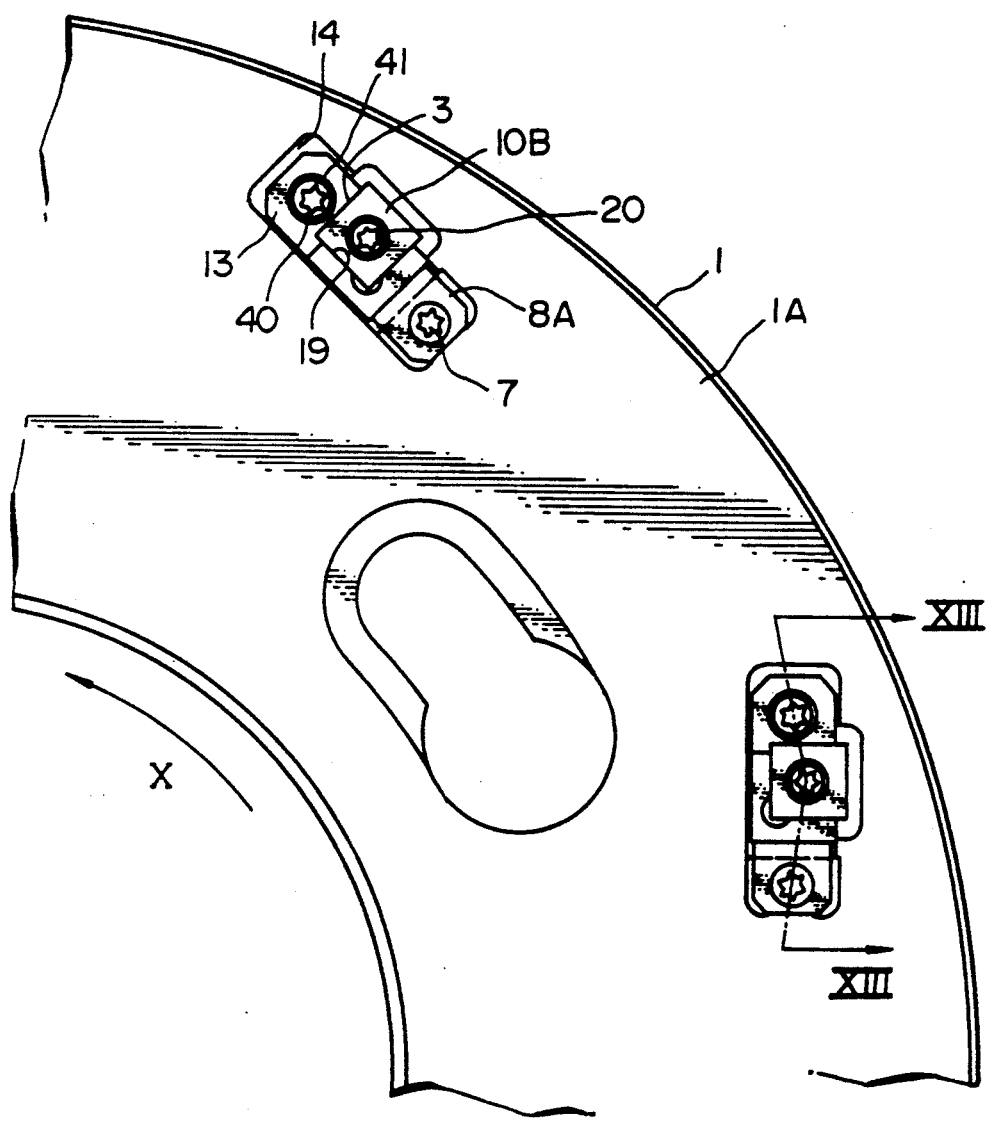

THROWAWAY MILLING CUTTER

BACKGROUND OF THE INVENTION

1. Field of the Invention

The present invention relates to a milling cutter having a indexable wiper cutter insert, in which easy and precise positioning of the wiper cutter insert is possible.

2. Prior Art

In general, a milling cutter for use in finishing workpieces has a wide and flat cutting edge, called a wiper cutting edge, for finishing at a front end of a cutter body. Particularly, a throwaway milling cutter (hereinafter referred to simply as "cutter") having an indexable wiper cutter insert (hereinafter referred to simply as "wiper tip") does not require sharpening of the cutting edge, so that the cutter body can be used over a relatively long service life. Therefore, the tool cost is lower, and this type of cutter is widely used.

With respect to this type of cutter, there is disclosed a cutter having cutting edges for ordinary cutting operations and having wiper cutting edges for finishing in Japanese Patent Laid-Open No. Sho 60-85816. In the cutter in Sho 60-85816, the ordinary cutting operation by the cutting edges and the finishing by the wiper cutting edges are performed concurrently.

FIGS. 14 and 15 show a conventional cutter such as in No. Sho 60-85816. The cutter in these figures comprises a cutter body 1 in the shape of a ring and having a rotational axis. A plurality of cutting edges 2 and at least one wiper cutting edge 3 are disposed at a radially outer surface of the cutter body 1. In the figures, only one wiper cutting edge 3 is shown.

In the cutter, a radially outer surface of the cutter body 1 is formed with chip pockets 4A, 4B by removing radially outwardly a part of the wall of the cutter body 1. Recesses 5A, 5B are formed at a trailing portion of the chip pockets 4a, 4b. Positioning pieces 6A, 6B are attached in the recesses 5A, 5B.

The positioning piece 6A is thrusted and fixed to the recess 5A by wedge 8 attached to the recess 5A. In contrast, the positioning piece 6B is fixed to the recess 5B only by a screw 9, so as to reduce the volume of the chip pocket 4B.

A tip 10A having a cutting edge 2 is removably mounted to a front end of the locating piece 6A, and a wiper tip 10B having a wiper cutting edge 3 is removably mounted to a front end of the positioning piece 6B.

The cutting edge 2 is located at a radially outer portion of the wiper cutting edge 3 in order to carry out finishing by the wiper cutting edge 3 immediately after the rough cutting by the cutting edge 2, so that the rough cutting and finishing can be performed concurrently.

In an ordinary cutter, the positions of the cutting edges are adjusted after changing the tips so that the edges are in the best positions to obtain a fine finished surface of the workpiece. Particularly, in a cutter having a wiper cutting edge, because remarkably high precision of the dimensions and fine roughness of the finished surface are required for the finished workpiece, positioning of a wiper cutting edge must be carried out by very small vertical movements of the wiper cutting tips i comparison with ordinary tips.

In a conventional cutter having a wiper cutting edge such as the above, positioning of the wiper cutting edge 3 is carried out in such way that the screw 9 is rotated to release the positioning piece 6B, and a spacing sheet (not shown) inserted between the bottom wall of the recess 5B and a lower face of the positioning piece 6B is changed with another piece having different thickness; alternatively, the spacing sheet is ground to reduce the thickness thereof.

However, in the former case, the fine positioning of the wiper cutting edge is impossible, and in the later case, positioning is very complicated.

In order to solve the above-mentioned problems, a positioning mechanism for a wiper cutting edge is disclosed in Japanese Patent Laid-Open No. Sho 60-186311, an example of which is shown in FIGS. 16 and 17. In this cutter, a radially outer surface of a cutter body 1 is formed with a chip pocket 16. A recess 14 is formed at a trailing portion of the chip pocket 16. A cartridge 13 is attached to the recess 14, and a wiper tip 10B having a wiper cutting edge 3 is removably attached at a front end of the cartridge 13. A wedge 8 is inserted in the rear side of the cartridge 13 and attached to the bottom wall of the recess 14 by a screw 7. In the cutter, the positioning of the wiper cutting edge 3 is carried out in such a way that the wedge 8 is pushed into the recess 14 by rotating the screw 7 so that the cartridge 13 is projected forward.

However, in the cutter, because the value of the movement of the wiper cutting edge 3 is large, fine positioning of the wiper cutting edge 3 cannot be performed.

SUMMARY OF THE INVENTION

It is therefore an object of the present invention to provide a cutter which can solve the above problems of the prior art cutters, so that the positioning of the wiper cutting edge can be precisely and easily carried out.

According to the invention, there is provided a cutter comprising: a cutter body rotatable about an axis; at least one recess formed at a front face of the cutter body and having a bottom wall and side walls; an inclined face formed at the bottom wall and inclined about the front face; a cartridge inserted in the recess movably along the inclination direction of the inclined face; a wiper cutting insert removably mounted to the cartridge and having a wiper cutting edge generally parallel to a plane perpendicular to the axis of the cutter body and a front flank face disposed adjacent to the wiper cutting edge; a wedge inserted between the side wall and the cartridge and capable of moving the cartridge along the inclination direction of the inclined face; and a clamp for clamping the cartridge to the recess.

In the invention, when the wedge is pushed into the recess, the cartridge is pushed by the wedge and moves along the inclination direction of the inclined face, projecting vertically, i.e., in the direction of the axis of the cutter body in accordance with the inclination angle of the inclined face. Therefore, by setting the inclination angle in a sufficiently small range, the vertical movement of the wiper cutting edge can be small in comparison with the vertical movement of the wedge. Thus, positioning of the wiper cutting edge can be carried out precisely and easily.

As the clamp for clamping the cartridge, another wedge can be applied. The second wedge is inserted in a space between the cartridge and the recess opposing the first wedge. The longitudinal position of the cartridge can be adjusted by adjusting the upper and lower positions of the first and second wedges.

In this construction, because the cartridge is pushed by two wedges, the mounting stability of the cartridge can be increased.

Furthermore, the cartridge can be formed with a slit respectively on its lower face and its upper face; the wiper cutting insert can therefore be moved along the inclination direction of the inclined face when the wedge is pushed into the recess so as to elastically deform the portion adjacent the slit. In such a construction, because the cartridge must be unmovable, the clamping bolt can be omitted.

Moreover, the clamp can be a connecting pin capable of elastic bending. In this manner, the cartridge and the bottom wall of the recess are formed with holes respectively, an end of the connecting pin is inserted into the hole of the cartridge and another end of the connecting pin is inserted into the hole. In this construction, the cartridge can be moved along the inclination direction of the inclined face when the wedge is thrusted into the recess so as to elastically deform the connecting pin. The side wall of the end inserted into the hole of the cartridge is preferably in the shape of generally a sphere. Furthermore, the clamp can be a spacing piece capable of elastic deformation and inserted between the side face of the cartridge and the side wall of the recess.

BRIEF DESCRIPTION OF THE DRAWINGS

FIG. 12 is a plan view of a cutter viewed from the front end of the cutter according to the fifth embodiment of the invention;

DETAILED DESCRIPTION OF THE PREFERRED EMBODIMENTS

Referring to the figures, embodiments of the cutter according to the present invention are shown. In the following description of the cutter, like numerals are applied to like components as in the above-mentioned conventional cutter to avoid repetition of the descriptions thereof.

Figure 1:
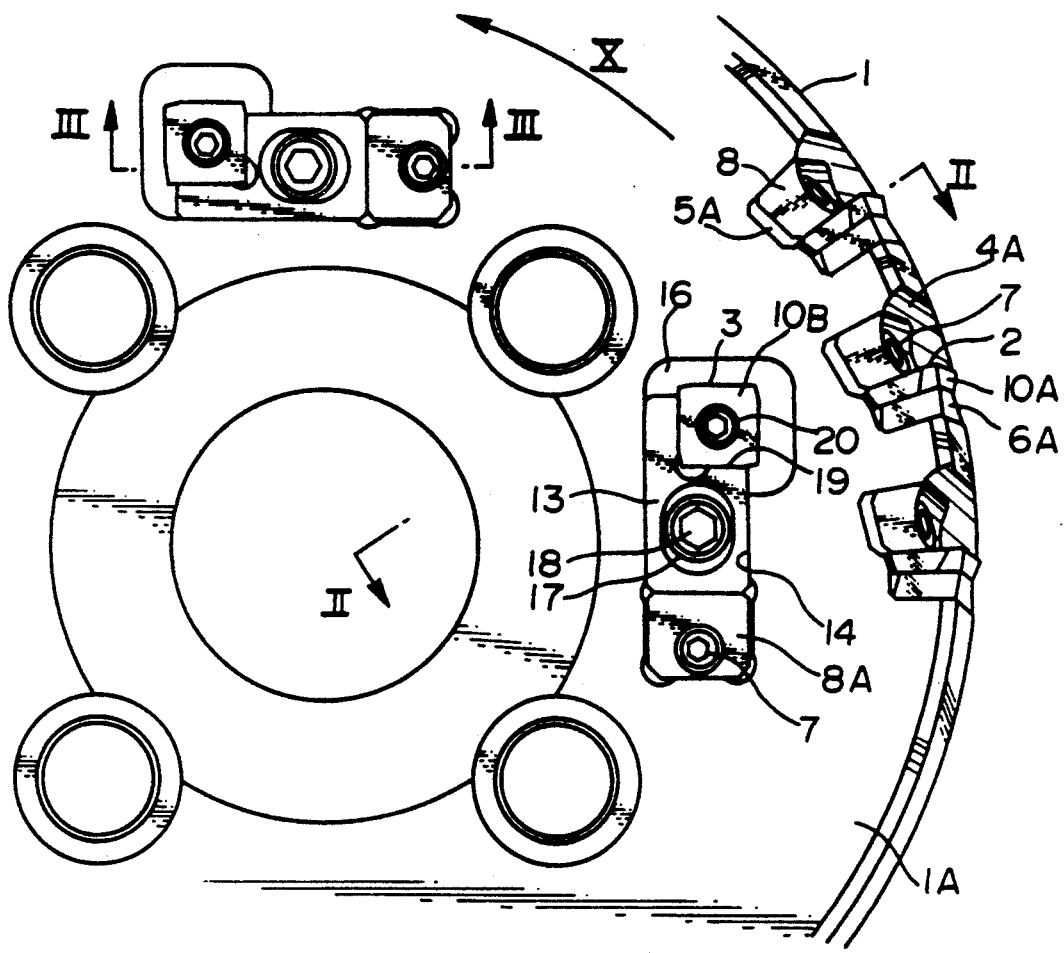
FIG. 1 is a plan view of a cutter when viewed from the front end of the cutter according to the first embodiment of the invention.
Figure 2:
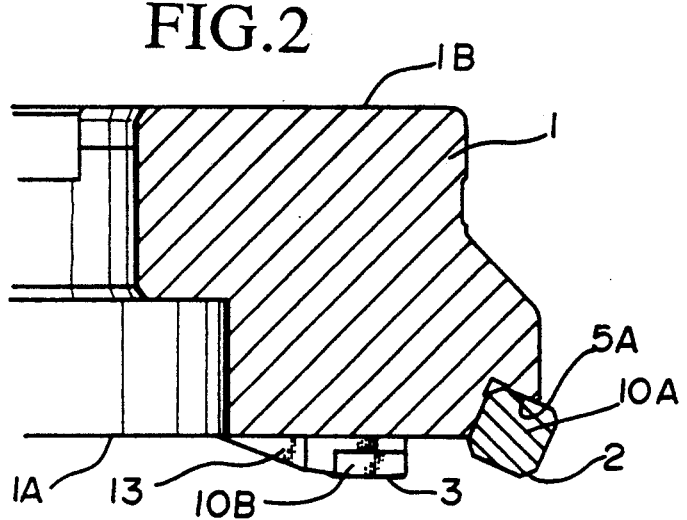
FIG. 2 is a cross-sectional view taken along the line II—II in FIG. 1.
Figure 3:
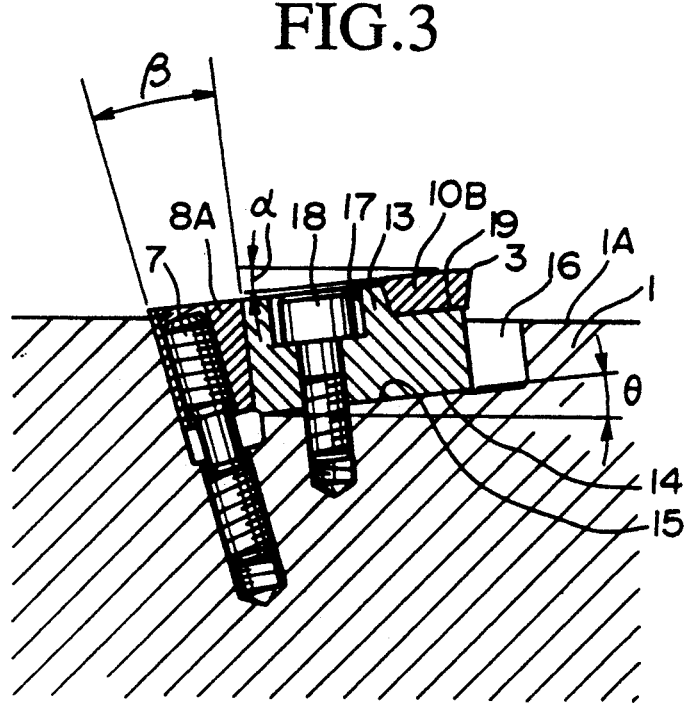
FIG 3 is a cross-sectional view taken along the line III—III in FIG. 1.

FIGS. 1 through 3 show the first embodiment of the invention. In the figures, a cutter body 1 is in the shape of a ring and is formed with a plurality of recesses 14 at a front face thereof. The longitudinal axes of the recesses 14 are parallel to tangential lines of a circle drawn about the rotational axis of the cutter body 1, and are remote from the axis at the same distance. The bottom wall of the recess 14 is formed with an inclined face 15 which is upslope toward the cutting direction of the cutter (indicated by arrow X). A chip pocket 16 is formed at a leading portion of the recess 14.

A cartridge 13 is inserted in the recess 14, movably along the inclination direction of the inclined face 15. The cartridge 13 is formed with a hole 17 having an elliptical cross section and attached to the recess 14 by a clamping bolt 18 penetrating the hole 17 and fastened to the bottom wall 15 of the recess 14. The cartridge 13 is formed with a tip mounting recess 19 at a leading end of the cartridge 13. A wiper tip 10B in the shape of a square plate is removably mounted to the tip mounting recess 19 by a screw 20. The wiper tip 10B is arranged such that a wiper cutting edge 3 formed at a ridgeline of the wiper tip 10B is projected forward from a front face 1A of the cutter body 1. As shown in FIG. 3, the direction of the wiper cutting edge 3 is parallel to a boss 1B of the cutter body 1.

A wedge 8A is inserted toward the bottom wall of the recess 14 between the cartridge 13 and the side wall of the recess 14. The side wall is at an opposite side of the cutting direction. The wedge 8A is vertically movably attached to the bottom wall of the recess 14 by a screw 7.

In the cutter arranged as described above, positioning of the wiper cutting edge 3 is carried out in such way that the upper and lower position of the wedge 8A is adjusted by rotating the screw 7. That is, at first, the clamping bolt 18 is rotated to release the cartridge 13, and then the screw 7 is rotated to push the wedge 8A into the recess 14. By this operation, the side face of cartridge 13 is pushed by the wedge 8A, so that the cartridge 13 moves toward the inclination direction of the inclined face 15. As a result, the wiper cutting edge 3 projects in the direction of the forward end of the cutter body 1, and the best suited position of the wiper cutting edge 3 is thus set.

In the cutter as above, the forward movement of the wiper cutting edge 3 is very small in comparison with the movement of the wedge 8A. Therefore, in the cutter, the fine adjustment of the wiper cutting edge 3 can be carried out, so that precise and easy positioning of the wiper cutting edge 3 is possible.

Furthermore, the stability of mounting the wiper tip 10B can be increased since the thrust cutting load is received by the broad inclined face 15.

The inclination angle $\theta$ between inclined face 15 and front face 1A of the cutter body 1 is preferably set at the range of 5° to 30° so as to carry out the fine adjustment and maintain necessary adjustment length.

In this embodiment, the flank angle α of the front flank face disposed adjacent the wiper cutting edge 3 is set equal to the angle θ; the wedge angle β is set at 10°.

Figure 4:
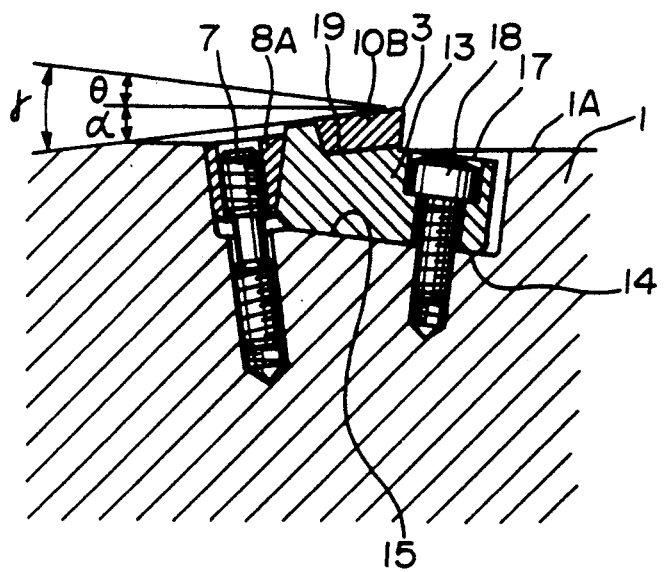
FIG. 4 is a variation of the first embodiment of the invention.

FIG. 4 shows a variation of the first embodiment. In this embodiment, the inclined face 15 is downslope toward the cutting direction of the cutter. Therefore, when the wedge 8A is pushed into the recess 14, the cartridge 13 moves and the wiper cutting edge 3 is retracted. In this embodiment, in order to set the flank angle α to a positive angle for the front flank face, the angle γ between the front flank face and the inclined face 15 must be larger than the inclination angle θ between the inclined face 15 and the front face 1A of the cutter body 1.

As mentioned above, in the first embodiment of the cutter, a slight adjustment for the positioning of the wiper cutting edge 3 can be carried out since the forward movement of the wiper cutting edge 3 is reduced by virtue of the construction including the inclined face 15, so that the positioning of the wiper cutting edge 3 can be carried out precisely and easily.

Figure 5:
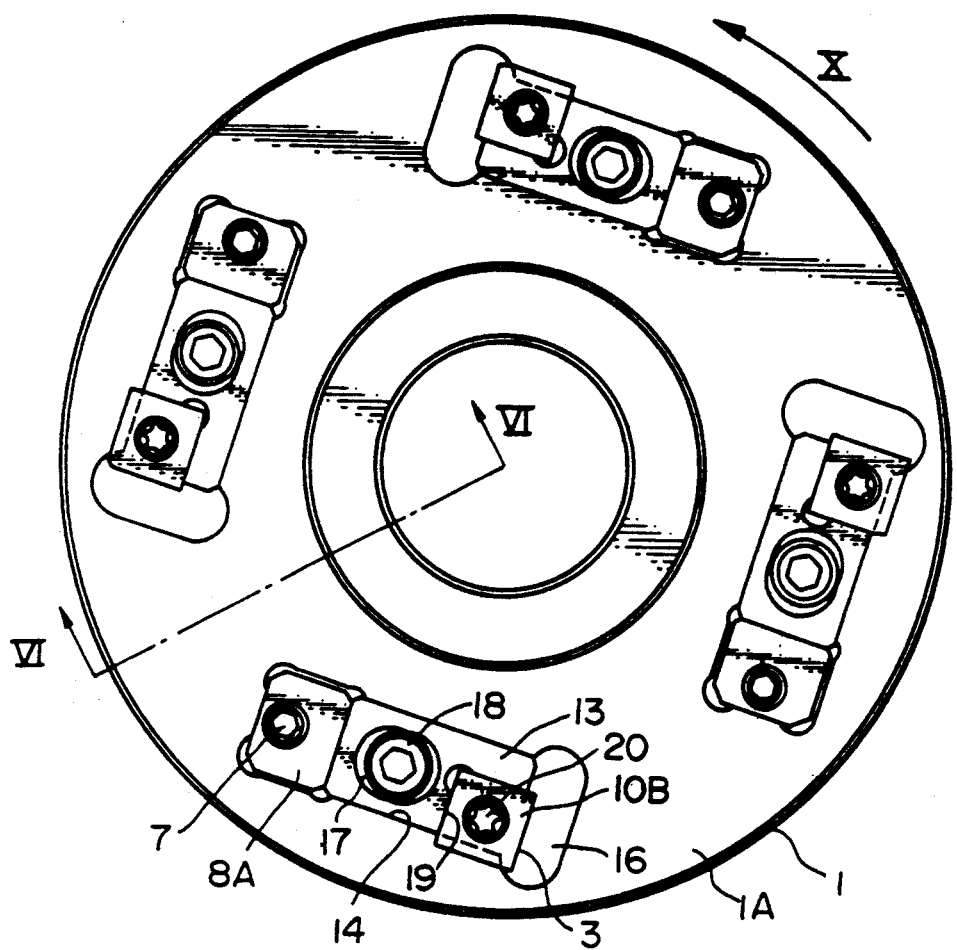
FIG. 5 is a plan view of a cutter viewed from the front end of the cutter according to the second embodiment of the invention.
Figure 6:
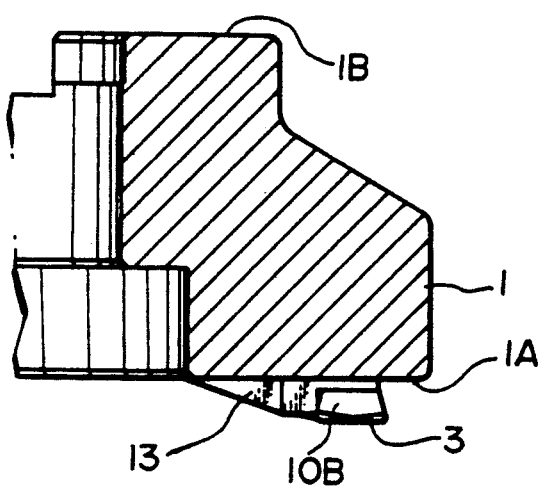
FIG. 6 is a cross-sectional view taken along the line VI—VI in FIG. 5.

FIGS. 5 and 6 show the second embodiment of the invention which is applied to a cutter to be used only for finishing. This embodiment differs from the first embodiment in that the cutter has only wiper tips 10B in it. Other constructions of the second embodiment are the same as in the first embodiment. Therefore, the cutter of the second embodiment has the same advantages as the first embodiment.

Figure 7:
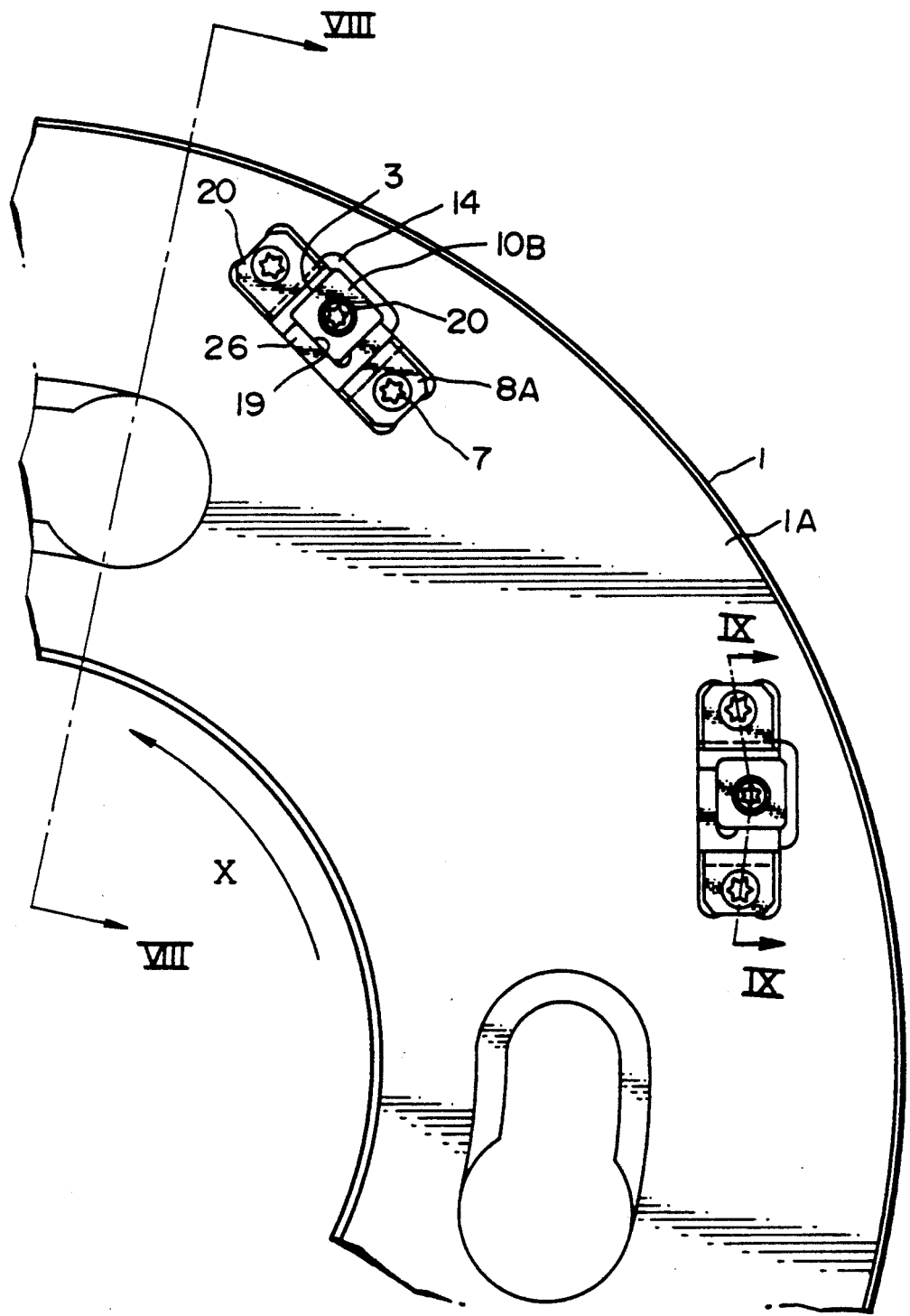
FIG. 7 is a plan view of a cutter viewed from the front end of the cutter according to the third embodiment of the invention.
Figure 8:
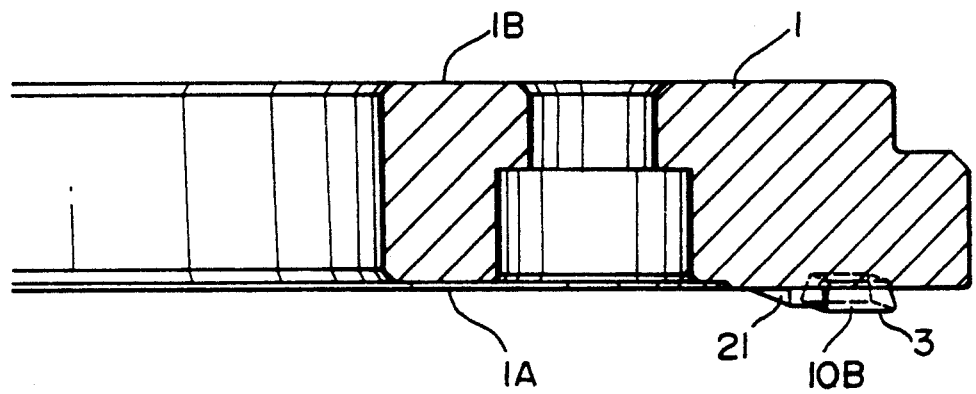
FIG. 8 is a cross-sectional view taken along the line VIII—VIII in FIG. 7.
Figure 9:
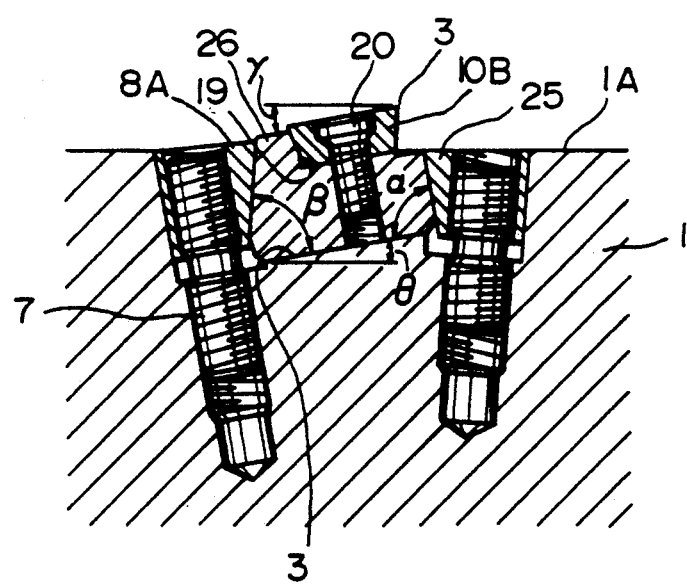
FIG. 9 is a cross-sectional view taken along the line XI—XI in FIG. 7.

FIGS. 7 through 9 show the third embodiment of the invention. This embodiment is different from the second embodiment in the point that the cutter includes a second wedge 20 opposing the first wedge 8A. The second wedge 20 is inserted in a space between a cartridge 21 and the recess 14.

In the cutter arranged as described above, the positioning of the wiper cutting edge 3 is carried out by adjusting upper and lower positions of the first wedge 8A and the second wedge 20.

The cutter of third embodiment has the same advantages as the second embodiment. Particularly, in the cutter, because the cartridge 21 is pushed by two wedges 8A and 20, the stability of mounting cartridge 21 can be increased.

Figure 10:
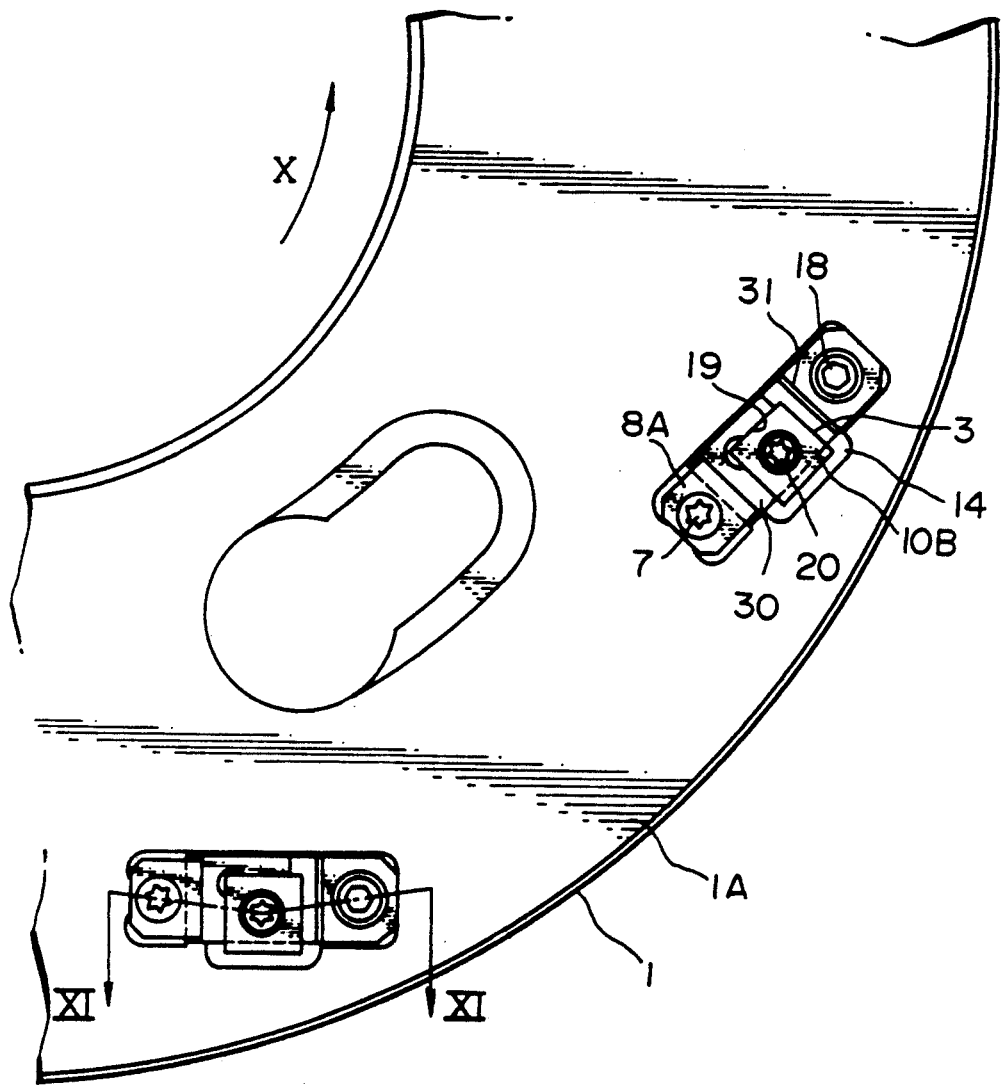
FIG. 10 is a plan view of a cutter viewed from the front end of the cutter according to the forth embodiment of the invention.
Figure 11:
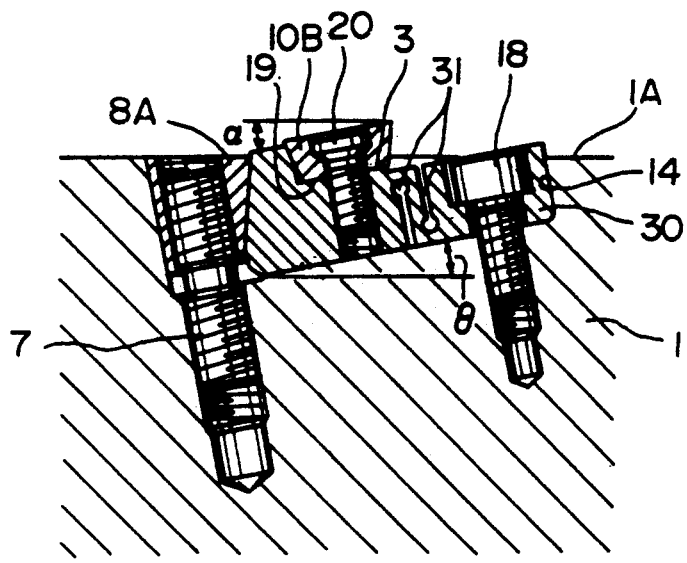
FIG. 11A is a cross-sectional view taken along the line XI—XI in FIG. 10.
FIG. 11B is a variation of the fourth embodiment of the invention.

FIGS. 10 and 11A show the fourth embodiment of the invention. This embodiment is different from the second embodiment in that a cartridge 30 is inserted in the recess 14 unmovably. The lower face and the upper face of the cartridge 30 are formed with slits 31 respectively.

In the cutter, when the wedge 8A is push into the recess 14, the side face of the cartridge 30 is pushed by the wedge 8A and moves with the wiper tip 10B along the inclination direction of the inclined face 15 elastically deforming the portion adjacent to the slit 31.

The cutter of the fourth embodiment has the same advantages as that of the second embodiment. Particularly, in the cutter, because the side face of the cartridge 30 urges the wedge 8A by the elastic force of the portion adjacent to the slit 31, the positioning of the wiper cutting edge 3 can be carried out more easily and precisely.

Figure 11B:
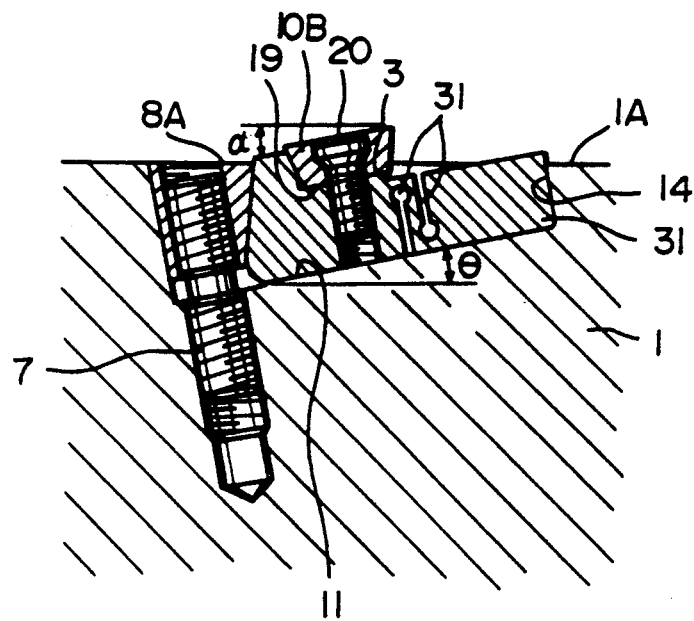

FIG. 11B shows a variation of the fourth embodiment. The cutter in FIG. 11B is different from the above cutter in that the cutter is not provided with the clamping bolt 18 as in the FIG. 11A.

Figure 13:
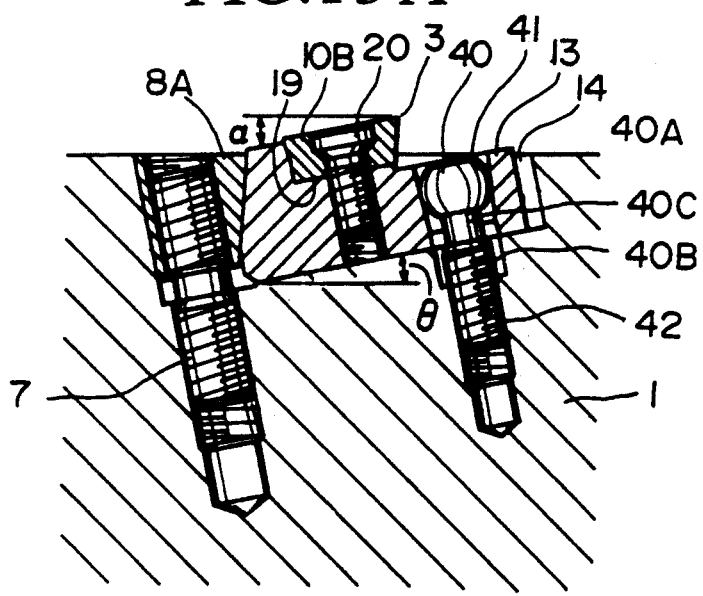
FIG. 13A is a cross-sectional view taken along the line XIII—XIII in FIG. 12.
FIG. 13B is a variation of the fifth embodiment of the invention.

FIGS. 12 and 13 show the fifth embodiment of the invention. This embodiment differs from that of the second embodiment in that the cutter includes a connecting pin 40 which is capable of elastic bending, instead of the clamping bolt 18 for the cartridge 13. That is, the cartridge 13 is formed with a tapered hole 41, which receives an end of the connecting pin 40, and the bottom wall of the recess 14 is formed with a screw hole 42 which receives another end of the connecting pin 40. The end inserted into the cartridge 13 is formed with a head 40A, the side wall of which is in the general shape of a portion of a sphere. Another end inserted into the bottom wall of the recess 14 is formed with a screw 40B. The intermediate portion between the head 40A and the screw 40B is formed with a small diameter portion 40C capable of elastic deformation.

For this construction, when the wedge 8A is pushed into the recess 14, the side face of the cartridge 8A is pushed by the wedge 8A, and the cartridge 8A is moved along the inclination direction of the inclined face 15 elastically bending the connecting pin 40.

Thus, the cutter of the fifth embodiment has the same advantages as that of the fourth embodiment. That is, the positioning of the wiper cutting edge 3 can be carried out more easily, since the cartridge 13 urges the wedge 8A by the elastic force of the small diameter portion 40C of the connecting pin 40.

Figure 13B:
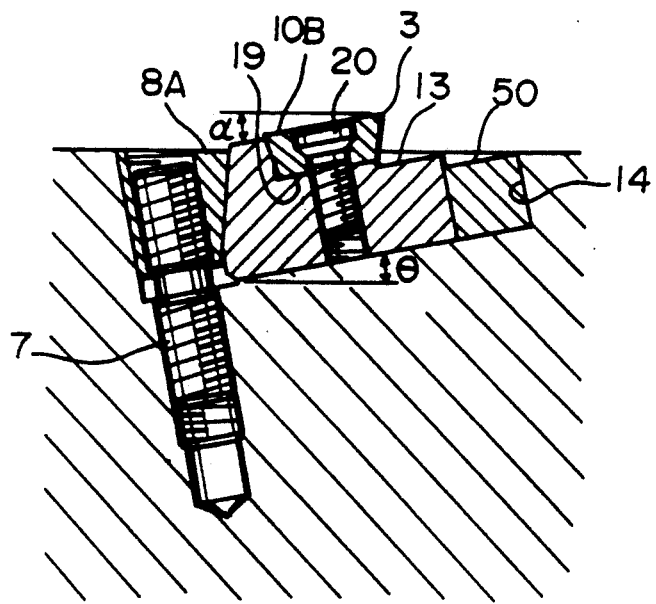
Figure 16:
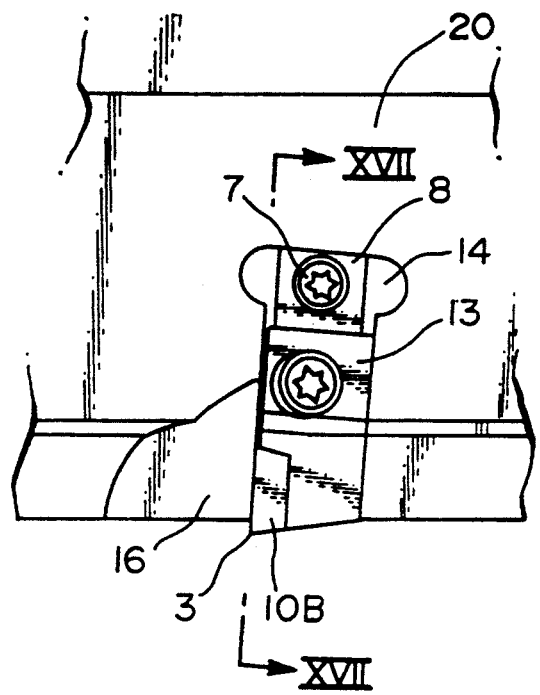
FIG. 16 is a plan view of another conventional cutter.
Figure 17:
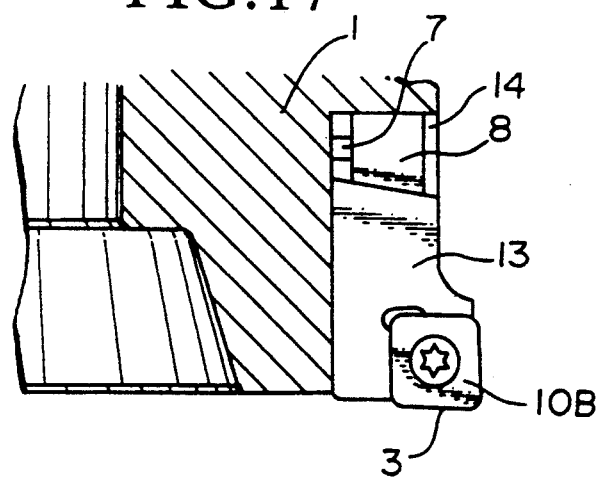
FIG. 17 is a cross-sectional view taken along the line XVII—XVII in FIG. 16.
Figure 14:
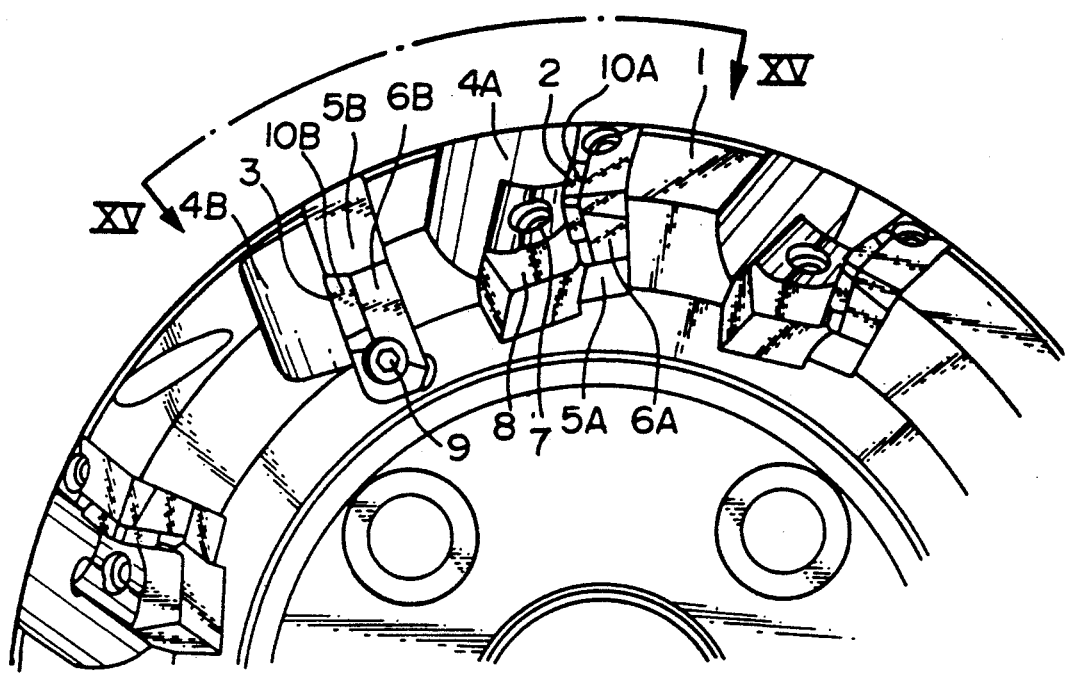
FIG. 14 is a plan view of a conventional cutter.
Figure 15:
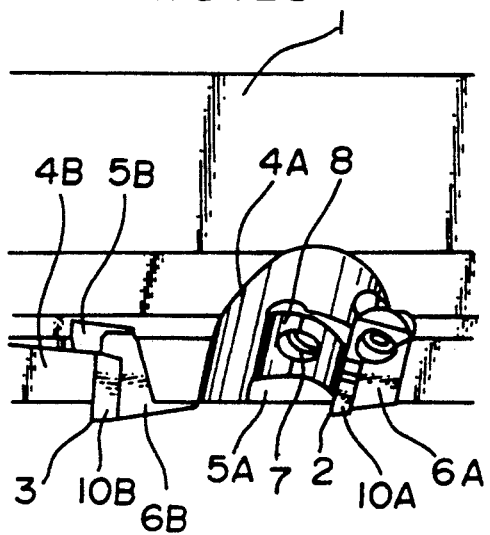
FIG. 15 is a cross-sectional view taken along the line XV—XV in FIG. 14.

FIG. 13B shows a variation of the above fifth embodiment. The cutter in FIG. 13B includes a positioning piece 50 instead of the connecting pin 40. The positioning piece 50 is made of a resin, such as urethane, capable of elastic deformation. This cutter can obtain the same advantages as that of the fifth embodiment.

What is claimed is:

1. A throw-away milling cutter comprising:
   a cutter body rotatable about an axis, said cutter body having a rear face and a front face directed toward a workpiece;
   at least one recess formed at the front face of the cutter body, said recess having a bottom wall and side walls;
   an inclined face formed at the bottom wall, said inclined face being inclined toward a given direction with respect to the front face when the front face is directed upwardly;
   a cartridge inserted in the recess movably along said given direction of the inclined face;
   a wiper cutting insert removably mounted to the cartridge, said wiper cutting insert having a wiper cutting edge generally parallel to a plane perpendicular to the axis of the cutter body and a front flank face disposed adjacent to the wiper cutting edge;
   a wedge inserted between the side wall and the cartridge, said wedge being capable of moving the cartridge along said given direction of the inclined face; and
   a means for clamping the cartridge to the recess.

2. A throwaway milling cutter according to claim 1, wherein said wedge is inserted toward said bottom wall of the recess.

3. A throwaway milling cutter according to one of claims 1 and 2, wherein said cartridge is clamped by a clamp bolt perpendicularly attached to the bottom wall of the recess.

4. A throwaway milling cutter according to claim 3, wherein said inclined face is upslope toward the cutting direction and is parallel to said front flank face, said wedge disposed at the lower surface of the inclined face.

5. A throwaway milling cutter according to claim 3, wherein said inclined face is downslope toward the cutting direction, and the angle between the inclined face and said front flank face is set to be greater than the inclined angle of the inclined face so as to set a positive flank angle to said front flank angle, said wedge disposed at the upper surface of the inclined face.

6. A throwaway milling cutter according to claim 5, wherein said cutter body is formed with second recesses at a forward and radially outward position thereof, a throughway cutter insert attached to the second recess, said throughway cutter insert having a major cutting edge facing toward the forward and radially outward direction.

7. A throwaway milling cutter according to claim 3, wherein said means for clamping is a second wedge inserted in a space between said cartridge and said recess opposing said wedge, so that the longitudinal position of the cartridge can be adjusted by adjusting upper and lower positions of the wedge and the second wedge.

8. A throwaway milling cutter according to claim 6, wherein said clamping means is a connecting pin capable of elastic bending, said cartridge and said bottom wall of the recess formed with a hole respectively, an end of the connecting pin inserted into the hole of the cartridge and another end of the connecting pin inserted into the hole, so that the cartridge can be moved along the inclination direction of said inclined face when the wedge is pushed into said recess so as to elastically deform the connecting pin.

9. A throwaway milling cutter according to claim 8, wherein the side wall of the end inserted into the hole of the cartridge is generally in the shape of a portion of a sphere.

10. A throwaway milling cutter according to claim 6, wherein said clamping means is a spacing piece inserted between the side face of the cartridge and the side wall of said recess, said spacing piece capable of elastic deformation, so that the cartridge can be moved along the inclination direction of said inclined face when the wedge is thrusted into said recess so as to elastically deform the spacing piece.

11. A throw-away milling cutter comprising:
- a cutter body rotatable about an axis, said cutter body having a rear face and a front face directed toward a workpiece;
- at least one recess formed at the front face of the cutter body, said recess having a bottom wall and side walls;
- an inclined face formed at the bottom wall, said inclined face being inclined toward a given direction with respect to the front face when the front face is directed upwardly;
- a cartridge inserted in the recess so as to be immovable;
- a wiper cutting insert removably attached to the cartridge, said wiper cutting insert having a wiper cutting edge generally parallel to a plane perpendicular to the axis of the cutter body and a front flank face disposed adjacent to the wiper cutting edge;
- a wedge inserted between the side wall and the cartridge, said wedge being capable of pushing the side face of the cartridge toward said given direction of the inclined face;
- said cartridge having a lower face contacting with said inclined face and an upper face mounting said wiper cutting insert, said lower and upper face being formed with at least one slit, respectively, so that the wiper cutting insert can be moved along said given direction of said inclined face when the wedge is pushed into said recess so as to elastically deform the portion adjacent to the slit.

* * * * *